US010036809B2

(12) United States Patent
Shin et al.

(10) Patent No.: US 10,036,809 B2
(45) Date of Patent: Jul. 31, 2018

(54) REAL-TIME WARNING FOR DISTRACTED PEDESTRIANS WITH SMARTPHONES

(71) Applicant: The Regents of The University of Michigan, Ann Arbor, MI (US)

(72) Inventors: Kang G. Shin, Ann Arbor, MI (US); Yu-Chih Tung, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 405 days.

(21) Appl. No.: 14/865,262

(22) Filed: Sep. 25, 2015

(65) Prior Publication Data

US 2016/0091606 A1 Mar. 31, 2016

Related U.S. Application Data

(60) Provisional application No. 62/055,852, filed on Sep. 26, 2014.

(51) Int. Cl.
*G01S 15/93* (2006.01)
*G01S 15/02* (2006.01)
*G01S 15/08* (2006.01)
*G01S 15/52* (2006.01)

(52) U.S. Cl.
CPC ............ *G01S 15/93* (2013.01); *G01S 15/025* (2013.01); *G01S 15/08* (2013.01); *G01S 15/526* (2013.01)

(58) Field of Classification Search
CPC ........ G01S 15/025; G01S 15/08; G01S 15/93; G01S 15/526
See application file for complete search history.

(56) References Cited

U.S. PATENT DOCUMENTS

| 5,314,037 A | 5/1994 | Shaw et al. | |
| 8,886,256 B2* | 11/2014 | Harada | H04M 1/72522 340/467 |
| 9,656,607 B2* | 5/2017 | Stein | G08G 1/16 |
| 2006/0261978 A1* | 11/2006 | Yokota | G08G 1/005 340/933 |

(Continued)

FOREIGN PATENT DOCUMENTS

| EP | 2271134 A1 | 1/2011 |
| JP | 1996203000 A | 8/1996 |
| WO | WO-2013013127 A1 | 1/2013 |

OTHER PUBLICATIONS

Peng et al., "A smartphone-based obstacles sensor for the visually impaired", Journal: Ubiquitous Intelligence and Computing, vol. 6406, pp. 590-604 (2010).

(Continued)

*Primary Examiner* — Daniel Pihulic
(74) *Attorney, Agent, or Firm* — Harness, Dickey & Pierce, P.L.C.

(57) ABSTRACT

Studies have shown that using smartphones while walking increases the probability of pedestrians colliding with obstacles. Techniques are presented for providing real-time warnings to distracted users of smartphones. The techniques are implemented by an application which makes use of sensors commonly found in most smartphone. By estimating distances to nearby objects using acoustic signals, a generalized solution is achieved without requiring any prior knowledge of the user's environment. The process can be enhanced by using images acquired from the phone's rear camera.

18 Claims, 15 Drawing Sheets

(56) References Cited

U.S. PATENT DOCUMENTS

| | | |
|---|---|---|
| 2011/0143816 A1 | 6/2011 | Fischer |
| 2011/0169626 A1 | 7/2011 | Sun et al. |
| 2012/0264406 A1 | 10/2012 | Mohler |
| 2013/0029730 A1* | 1/2013 | Harada ............. H04M 1/72522 455/566 |
| 2016/0044394 A1* | 2/2016 | Derom .................... H04R 1/00 367/95 |
| 2017/0199274 A1* | 7/2017 | Sasabuchi ............. G01S 13/931 |

OTHER PUBLICATIONS

Liu et al., "Guoguo: Enabling fine-grained indoor localization via smartphone", Journal: International Conference on Mobile Systems, Applications, and Services, pp. 235-248 (2013).

Nirjon et al, "Auditeur: A mobile-cloud service platform for acoustic event detection on smartphones", Journal: International Conference on Mobile Systems, Applications, and Services, pp. 403-416 (2013).

* cited by examiner

Walking Towards A Wall

Walking Away From A Wall

Blurred Images

HSV Transformation

Backprojection

Detection Result

REAL-TIME WARNING FOR DISTRACTED PEDESTRIANS WITH SMARTPHONES

CROSS-REFERENCE TO RELATED APPLICATIONS

This application claims the benefit of U.S. Provisional Application No. 62/055,852, filed on Sep. 26, 2014. The entire disclosure of the above application is incorporated herein by reference.

FIELD

The present disclosure relates to techniques for providing real-time warnings to distracted users of smartphones.

BACKGROUND

Studies have shown that using smartphones while walking—called distracted walking—significantly increases the probability of pedestrians colliding with dangerous objects. For example, the number of emergency room cases for injuries caused by distracted walking in 2010 exceeded 1500 in the United States, but based on statistics, the number of injuries is typically larger, by a factor of 1000, than the reported figure. Such accidents are also severe; for example people may walk distracted into the middle of the road and get knocked down by an oncoming car, or may bump into electric poles/trees causing head injuries.

Several applications are available in the Google Play Store that passively attempt to prevent people from bumping into obstacles, for example, showing the rear camera view of the phone in the background of certain applications. However, none of these applications can actively alert users in real time when they are approaching a dangerous object while focused on tasks with the phone. Moreover, such methods do not work if the background of applications, such as games, is not allowed to be changed.

To alleviate these problems, this disclosure proposes a mobile app for use on a smartphone which is referred to herein as BumpAlert. The BumpAlert application actively detects objects ahead of users and alerts them in real time of the objects. The BumbAlert application relies only on sensors readily available in most smartphones, and hence it can be easily implemented on any smartphone.

This section provides background information related to the present disclosure which is not necessarily prior art.

SUMMARY

This section provides a general summary of the disclosure, and is not a comprehensive disclosure of its full scope or all of its features.

A computer-implemented system is provided for identifying obstacles in path of a pedestrian using a handheld computing device. The system includes: a motion estimator, an acoustic detector and a motion filter. The motion estimator is configured to receive an input from an accelerometer and operates to determine speed at which the handheld computing device is moving. The acoustic detector is interfaced with a speaker in the handheld computing device and operates to emit acoustic signals via the speaker. The acoustic detector is also interfaced with a microphone in the handheld computing device and operates to detect the acoustic signals reflected by objects proximate to the handheld computing device. In response to detected acoustic signals, the acoustic detector determines distance to a given object using timing between the emitted acoustic signals and the detected acoustic signals. The motion filter is interfaced with the motion estimator and the acoustic detector. The motion filter determines rate at which distance to the given object is changing from the distance measures received from the acoustic detector and, in response to a determination that the rate at which the distance to the given object changes is substantially same (e.g., within one meter per second) to the speed at which the handheld computing device is moving, identifies the given object as an obstacle in the path of the pedestrian. In response to a determination that the rate at which the distance to the given object changes differs from the speed at which the handheld computing device is moving, the motion filter filters or otherwise ignores the given object.

In one embodiment, the motion filter estimates an expected distance to the given object using the distance to the given object, compares the expected distance for the given object to other distances determined by the acoustic detector, and increases probability that the given object is an obstacle when difference between the expected distance for the given object and at least one other distance determined by the acoustic detector is less than a threshold.

The system also includes an alert mechanism interfaced with the motion filter. The alert mechanism compares the distance to the given obstacle to a threshold and, in response to a determination that the distance to the given obstacle is less than the threshold, generates an alert for the pedestrian.

The system can further include a visual detector configured to receive image data from a camera in the handheld computing device and determine presence of objects in the path of the pedestrian from the image data. The motion filter determines a number of objects proximate to the handheld computing device and, in response to a determination that the number of object exceeds a threshold, activates the visual detector.

In one embodiment, the visual detector can determine the presence of objects from the image data by determining texture of the ground being traversed by the pedestrian and distinguishes an object as being different from the determined texture of the ground using a back-projection method. The visual detector can further determine tilt of the handheld computing device with respect to the ground using the input from the accelerometer, height of the handheld computing device from the ground using the acoustic signals, and a distance to a given object from the image data based in part on the tilt of the handheld computing device and the height of the handheld computing device.

In some embodiments, the motion filter identifies the given object as an obstacle a corresponding object occurs in the image data as determined by the visual detector.

In another aspect, a computer-implemented method is provided for warning a pedestrian of obstacles in the path of the pedestrian carrying a handheld computing device. The method includes: determining speed at which the computing device is moving from input of a motion sensor residing in the computing device; determining a present distance to a given object proximate to the computing device, where the distance is computed from timing between acoustic signals emitted from a speaker of the computing device and acoustic signals detected by a microphone of the computing device; determining rate at which distance to the given object is changing; identifying the given object as an obstacle in the path of the pedestrian, the identification occurring in response to a determination that the rate at which the distance to the given object changes is substantially same to the speed at which the handheld computing device is moving; and generating an alert for the obstacle in response to a determination that the distance to the given object is less than a threshold.

In one embodiment, the distance to the given object is determined by multiplying speed of sound by time difference between the signals reflect from the given object and corresponding acoustic signals emitted from the speaker.

In some embodiments, the given object is identified as an obstacle by determining distance to objects proximate to the computing device during a window of time; estimating an expected distance to the given object from the present distance to the given object and the speed at which the computing device is moving; comparing the expected distance for the given object to the distances of objects proximate to the computing device in the window of time; and increasing probability that the given object is an obstacle when difference between the expected distance for the given object and at least one of the distances of objects proximate to the computing device is less than a threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
FIG. 1 is a diagram of a mobile phone.
Figure 2:
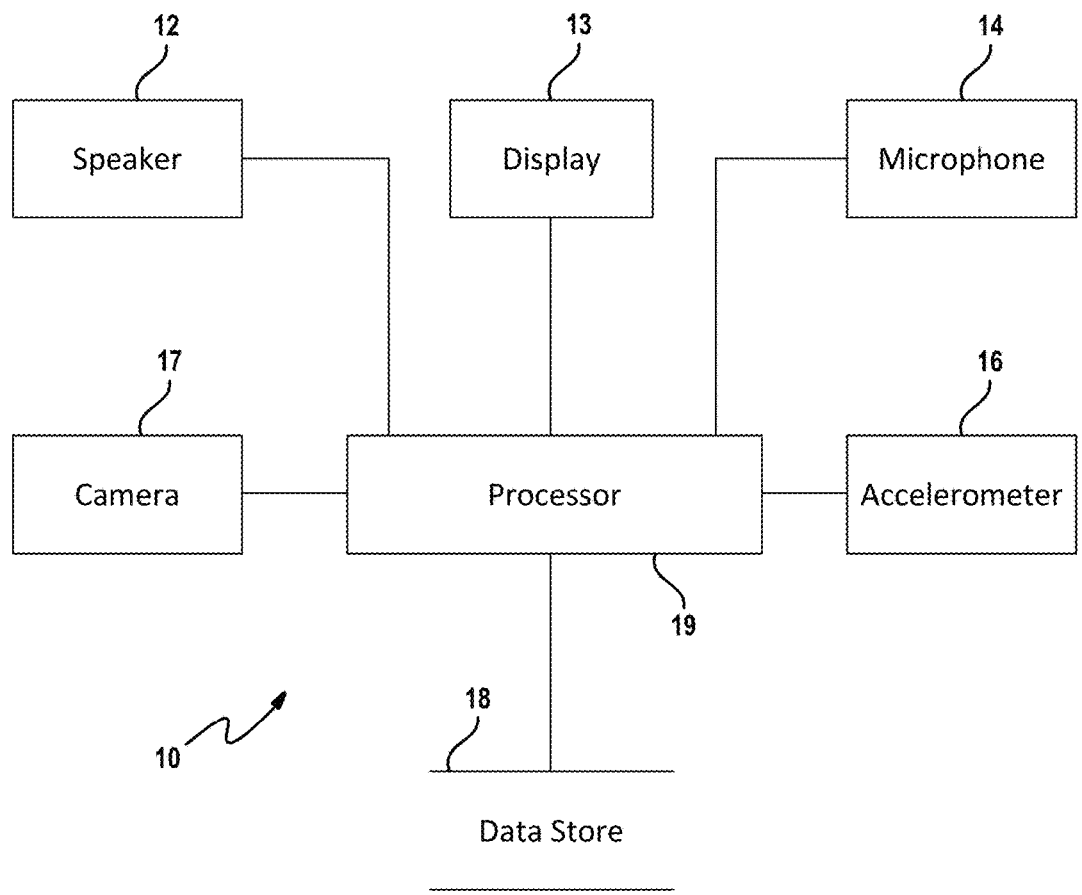
FIG. 2 is a block diagram depicting components in an example mobile phone.

FIGS. 1 and 2 depict an example handheld computing device 10, such as a mobile phone. The handheld computing device 10 includes a speaker 12, a microphone 14, an accelerometer 16 and a computer processor 19. The computing device 10 further includes one or more data stores 18 accessible to the computer processor 19 for storing data. The computing device 10 may optionally include a display 13 and a rear facing camera 17. Techniques for identifying obstacles in the path of a pedestrian carrying the mobile phone may be implemented as an application residing in the data store 18 and executed by the computer processor 19. While reference is made to a mobile phone, the techniques presented herein are applicable to other types of computing devices, such as PDAs, laptops and wearable devices (e.g., watches).

Figure 3:
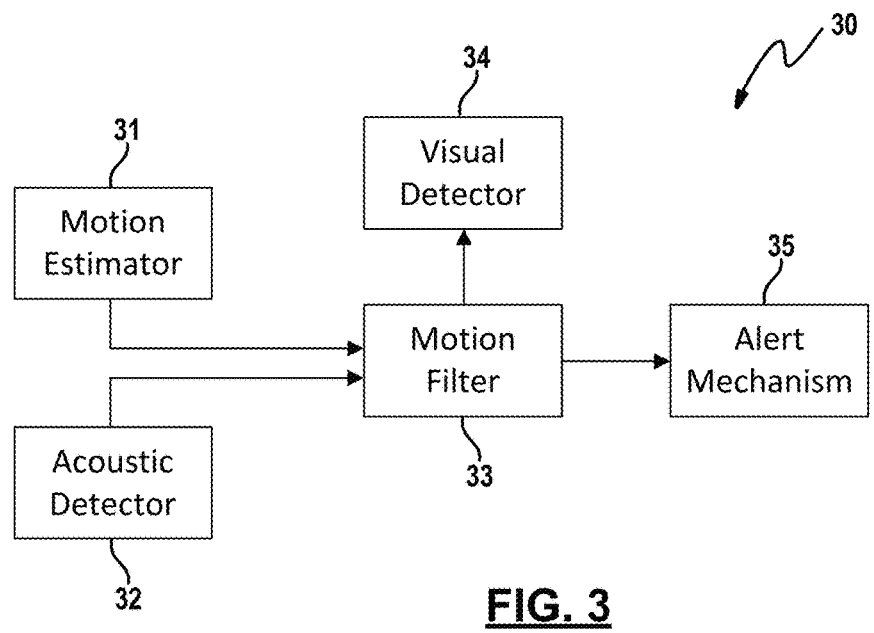
FIG. 3 is a block diagram depicting components of an application that provides real-time warnings for distracted users of smartphones.

FIG. 3 depicts the primary components which comprise the BumpAlert application 30. A motion estimator 31 is configured to receive an input from the accelerometer 16. The motion estimator 31 in turn determines the speed at which the mobile phone is moving from the input received from the accelerometer 16. Methods for determining speed from the input of an accelerometer are readily known to those in the art.

An acoustic detector 32 uses sound to estimate the distance between the mobile phone and nearby objects. To do so, the acoustic detector 32 is interfaced with both the speaker 12 and the microphone 14. The acoustic detector 32 emits acoustic signals via the speaker and detects, via the microphone 14, acoustic signals reflected by objects proximate to the mobile phone. From the detected acoustic signals, the acoustic detector 32 can estimate distance to nearby objects. Further information regarding the acoustic detector 32 is provided below.

A motion filter 33 evaluates the presence of objects and generates an alert for the user of the phone when an obstacle is in the path of the user. The motion filter 33 receives input from the motion estimator 31 and the acoustic detector 32. Given distance measures to one or more nearby objects, the motion filter 33 identifies proximate objects and determines rate at which distance to a given object is changing. When the rate at which the distance to a given object changes is substantially same to the speed at which the phone is moving, the given object is presumed to be in the path being traversed by the user of the mobile phone. Conversely, when the rate at which the distance to a given object changes differs from the speed at which the phone is moving, the given object is presumed to be outside of the path being traversed by the user of the mobile phone.

Presence of objects can be confirmed through the use of the camera 17 in the mobile phone. In some embodiments, a visual detector 34 is configured to receive image data from the camera 17 and determines and/or confirms the presence of objects using the image data. For example, the visual detector 34 can determine the presence of objects from the image data by determining texture of the ground being traversed by the pedestrian and distinguishing an object as being different from the determined texture of the ground. Further information regarding the visual detector 34 is provided below.

An alert mechanism 35 can also be interfaced with the motion filter 33. In some embodiments, the motion filter 33 can further determine a distance to the given object. The alert mechanism 35 in turn compares the distance to the given obstacle with a threshold and, in response to a determination that the distance to the given obstacle is less than the threshold, generates an alert for the user of the mobile phone. In one embodiment, haptic feedback is used to indicate the proximity of the obstacle (e.g., frequency of vibrations may correlate to the distance to the obstacle). In other embodiments, the alert mechanism 35 may provide visual and/or audible indication for the given obstacle. Other types of alerts are also contemplated by this disclosure.

The acoustic detector 32 borrows ideas from sonar sensors to achieve object detection. In the example embodiment, the acoustic detector 32 generates ten (10) repetitions of a sine wave at a frequency of 11025 Hz and picks up the reflections through the phone's microphones. In order to make the application compatible with most devices, the signal sent is sampled at 44.1 kHz and two successive signals are sent at 100 ms intervals to avoid receiving reflections generated by the previously sent signal.

To identify the signals reflected by objects, the recorded signal is first passed through a bandpass Finite Impulse Response (FIR) filter and then through the corresponding matched filter as shown in Algorithm 1 below.

---

Algorithm 1: Acoustic Detection

---

Input: acoustic signal array at the n-dh detection: $S_n$,
    peak window: $win_{peak}$, walking speed: w, threshold coefficient: $\alpha$
Output: delection result: $D_{succ}$
 1: $S \leftarrow$ matched_filter(bandpass_filter($S_n$))
 2: noise $\leftarrow$ estimate_noise(S) & thr $\leftarrow \alpha(noise_{mean}+noise_{std})$
 3: $P_n, D_n \leftarrow \phi$ & peakMax, peakOffset $\leftarrow 0$
 4: for i from $win_{peak}/2$ to len(S) $- win_{peak}/2 - 1$ do
 5:   isPeak $\leftarrow$ True
 6:   for j from i $- win_{peak}/2$ to i $+ wn_{peak}/2$ do
 7:     if S[j] > S[i] then
 8:       isPeak $\leftarrow$ False
 9:       break
10:   if isPath and S[i] > thr then
11:     $P_n \leftarrow P_n \cup i$
12:     if S[i] > peakMax then
13:       peakOffset $\leftarrow$ i
14:       peakMax $\leftarrow$ S[i]
15: for $p \in P_n$ do
16:   $d = speed_{sound}(p - peakOffset)/(2rate_{sample})$
17:   $D_n \leftarrow D_n \cup d$
18: $D_{succ} \leftarrow$ motion_filter($D_n, D_{n-1}, \ldots, D_{n-\delta}, \delta, w$)
19: return $D_{succ}$

---

Since the signal frequency used in application is 11025 Hz, the FIR filter is set to pass frequencies within [10 kHz, 12.05 kHz], and the matched filter is set to the signal itself. At the n-th record, the highest samples within a moving window are marked as peaks, $P_n$, if the signal exceeds a threshold, thr. Due to the automatic gain control (AGC) in microphones and different levels of environmental noise, thr is adapted based on the received noise level. In one example, the noise is observed from 600 samples before the sent signal is received and the threshold is set to $\alpha$(mean(noise)+std (noise)) where $\alpha$ is set to four (4). The width of the moving window, $win_{peak}$, is set to 40 samples, which is equal to the number of samples in the sent signal. The maximum resolution that can be discerned with these chosen parameters is about 15 cm, which is equal to the product of the duration of the signal and the speed of sound, so objects within 15 cm of each other will be classified as a single object.

Figure 4:
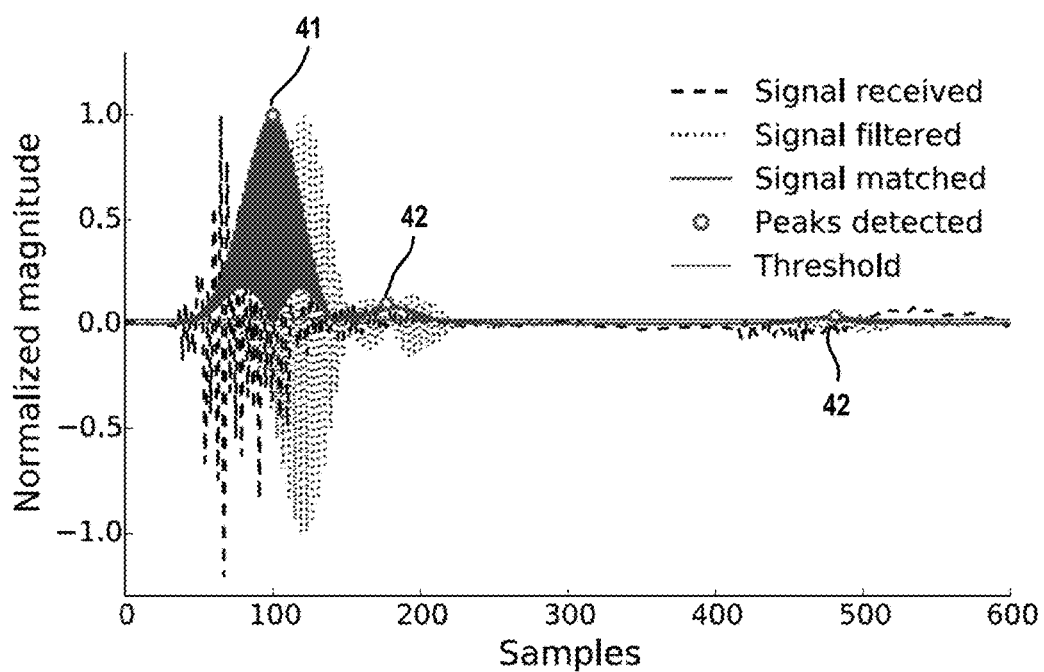
FIG. 4 is a graph depicting example measurements of an acoustic detector.

FIG. 4 shows an instance of acoustic detection. The first peak at 41 indicates the sound sent out of the speaker, while the second peak at 42 is the reflection from a human body 28 cm away, and the third peak at 43 is the reflection from the floor 142 cm away. Based on the ground truth, the error is less than 5 cm in this case. Although estimation accuracy can be improved further by using pulse compression with a wide-band signal such as Chirps or Barker codes, the narrow-band signal used in BumpAlert suffices for this application. With a detection range of 5 m and a maximum error of 15 cm, it ensures users have enough time to react and hence a higher resolution is not needed. Moreover, a narrow-band signal is more robust to ambient noise, as other frequencies can be filtered out. Thus, this method can be used even in a noisy environment, such as a busy road/street or a crowded shopping area.

Because most smartphones only support sampling ranges of 44.1 kHz and below, the frequency of the signal used should be less than half of the sampling frequency for its accurate recovery. Ideally, a higher frequency is preferred because the sound of such a frequency will be less audible to the user, but the sent and reflected signals also degrade more at a higher frequency. On the other hand, decreasing the signal frequency will increase the time necessary to send enough repetitions of the signal, which will decrease the detection resolution. Considering the ability of a lower frequency signal to propagate farther is unnecessary for detection of nearby obstacles, and it also increases the time interval between consecutive acoustic detections due to the increased maximum reflection distance. According to experiments, the signal frequency of 11025 Hz is sufficient to recover reflections within 2-4 m and reflections from the objects more than 10 m away are too weak to be detected. This enables detection of only those obstacles that are close by, and ensures that all significant reflections are received within 100 ms. Nonetheless, signals generated and sampled at other frequencies also fall within the broader aspects of this disclosure.

Using signals reflected from objects, the distance between the user and each object is computed by multiplying half the time needed for the reflected signals to be received by the speed of sound (i.e., 331 m/s). In this scheme, the performance depends strongly on the ability to accurately capture the time when signals are sent and their reflections are received. Errors of a few milliseconds will cause an estimation error of several meters due to the high speed of sound. Thus, any error between timestamps caused by non-real-time operating systems in mobile phones is unacceptable. This issue is addressed by recording the time when the (reflected) signal is sent (received) and then computing the time difference between the sent and the reflected signals in terms of the number of consecutive samples. As shown in FIG. 4, the signal identified with the largest magnitude, peakMax, is regarded as the sent signal, i.e., the signal directly going through the body of phone to its microphone. This is used as a reference, peakOffset, for computing the time difference between the sent and the reflected signals as shown in Algorithm 1. As the detection results show in FIG. 5A, when a user walks toward a wall (obstacle) from a position 10 m away, the acoustic detector 32 is able to identify the reflection (as the diagonal green hollow circles) from the wall when the users are 5 m away (as marked with the dotted line) at time 5. In this figure, the constantly appearing objects (i.e., two prominent vertical green hollow circle) estimate to be 30 cm and 150 cm away are the human body and the floor, respectively.

One limitation of acoustic detection is that phone speakers and microphones are omnidirectional, and hence the direction of the obstacle cannot be resolved. Another related problem is receiving multi-path reflections. The signal received by a microphone is actually a combination of the sent signal and multiple reflected copies of the same signal. Thus, an object that is actually 50 cm away may cause a false detection as 150 cm away due to multi-path reflections. This phenomenon is especially severe in an in-door environment where surfaces like walls cause multi-path problems.

Figure 5A:
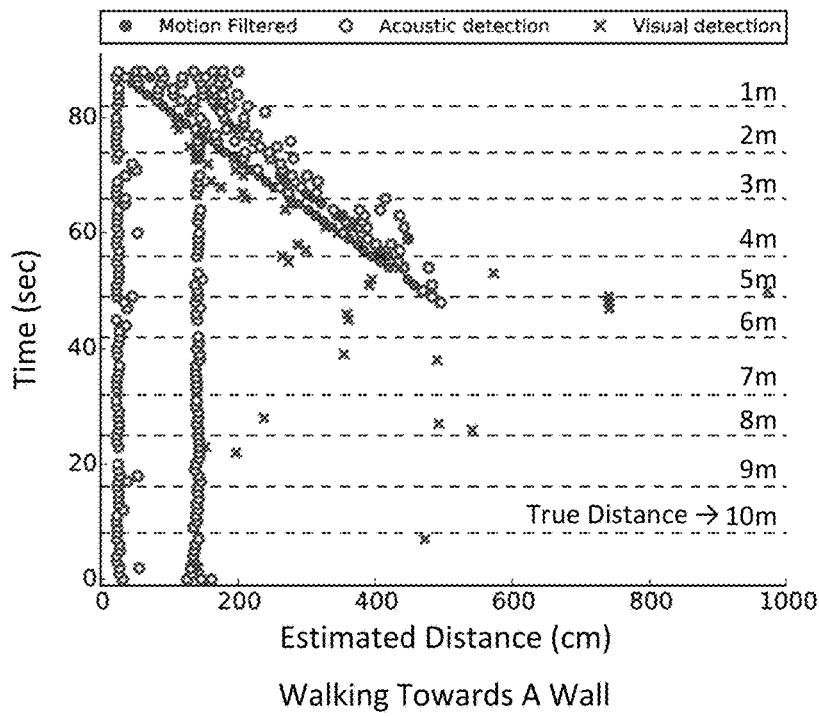
FIGS. 5A-5C are graphs depicting results of continuous acoustic detection while walking towards a wall, away from a wall, and towards a wall in an aisle, respectively.
Figure 5B:
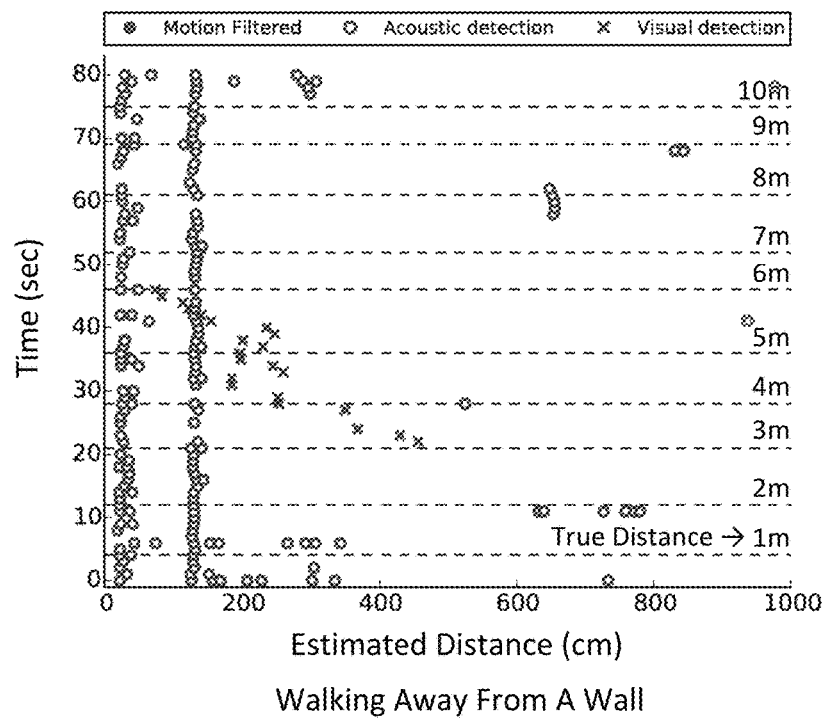
Figure 5C:
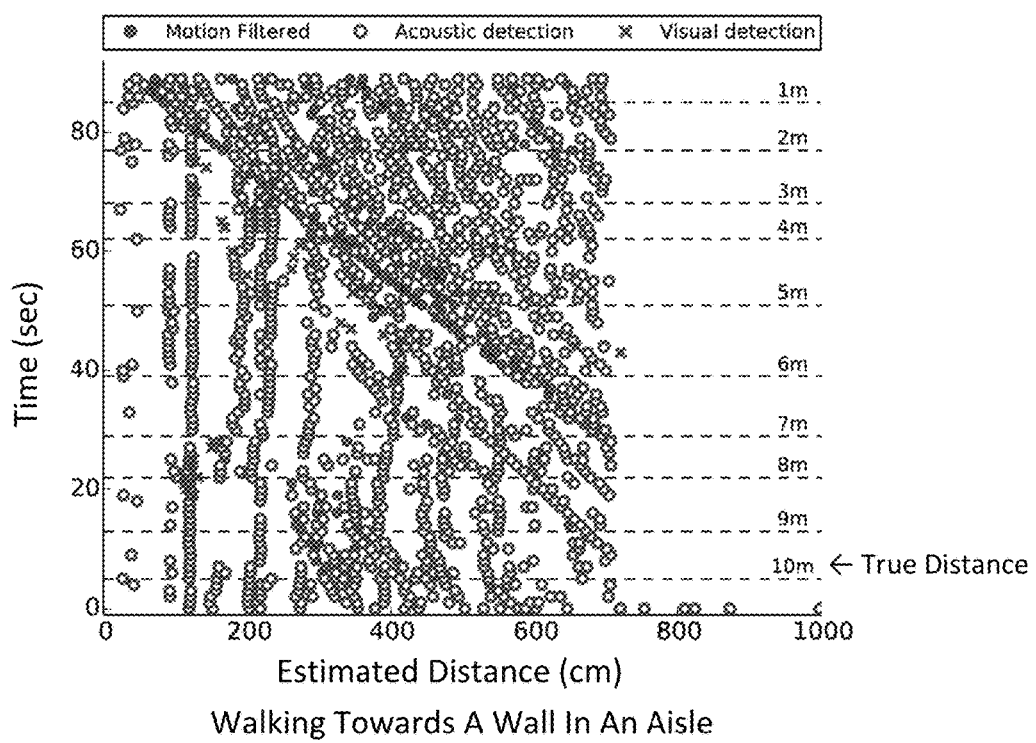
Figure 6A:
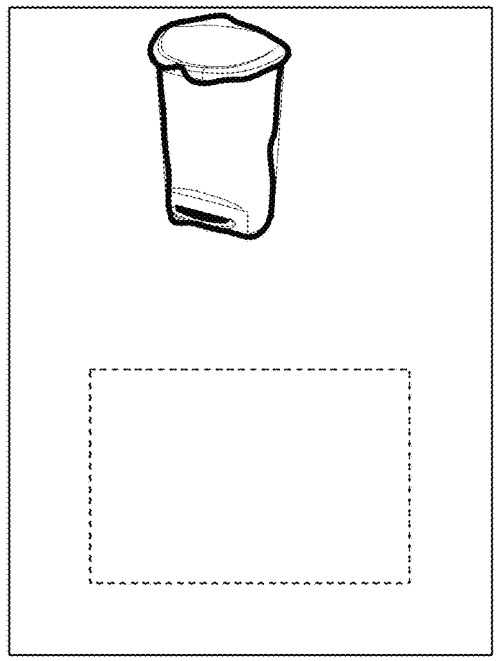
FIGS. 6A-6D are images taken by a rear facing camera of a mobile phone and manipulated by the application.
Figure 6B:
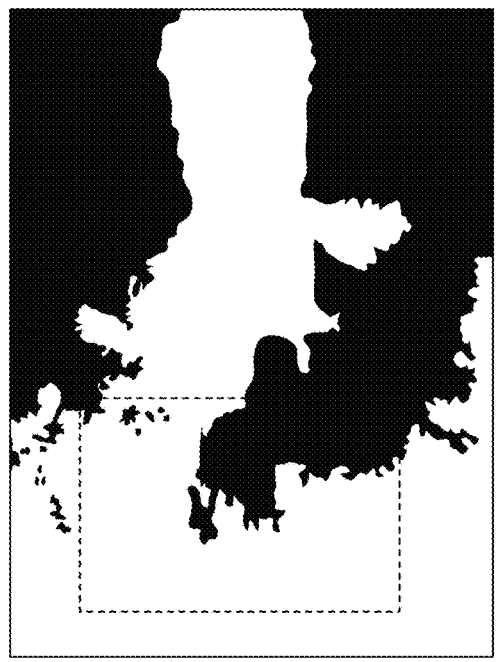
Figure 6C:
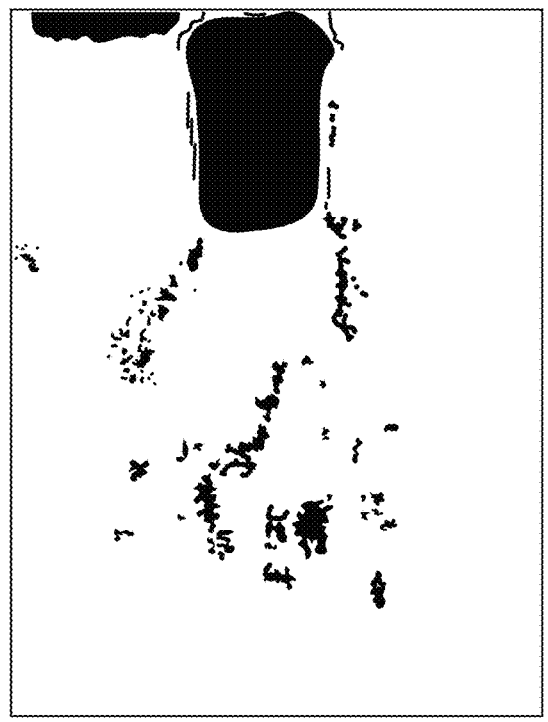
Figure 6D:
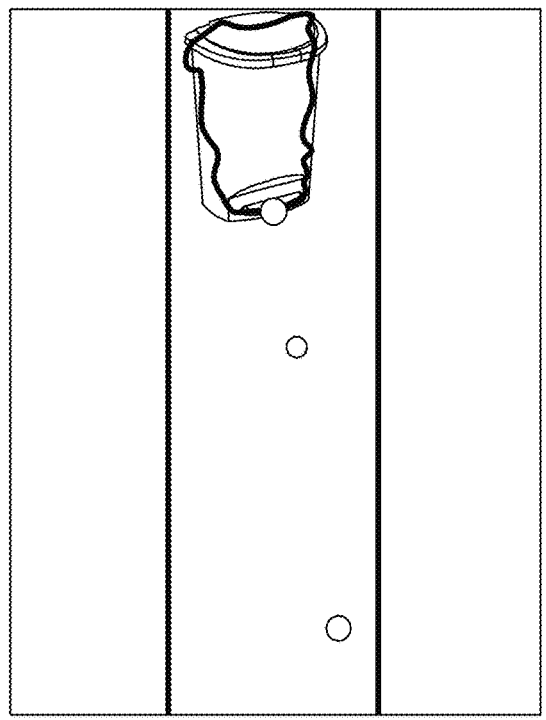

However, these two problems are greatly reduced due to the need to detect only the closest object, i.e., the shortest-path reflection. Most reflections from objects behind the user are also absorbed by the user's body which resembles the property of WiFi signals being blocked by people. As shown in FIG. 5B where the user is walking away from a wall, the acoustic detector doesn't detect any prominent peaks of reflections even if the wall is just 1 m behind the user at time 0. This feature helps the acoustic detector 32 prevent from making wrong estimations when the object is actually behind the user. However, the detection results will still be affected by reflections from objects along the sides, such as walls and pillars. As shown in FIG. 5C, the same experiment of a user walking towards a wall from 10 m away is repeated but in a narrow aisle. False detections are made due to side walls (vertical green hollow circles between 2 m and 6 m), rendering the application difficult to identify the real reflection from the obstacle (i.e., the wall in front of the user).

To improve the detection results further, the motion filter 33 is used to eliminate the detected reflections which have no relative speed to the user. The user's walking speed is estimated by the accelerometer as described later. Given the walking speed, w, and a history of δ previous detection results, $D_{n-1}, D_{n-2}, \ldots, D_{n-\delta}$, the reflections of objects with the same relative speed as the user's walking speed are classified as true obstacles toward which the user is walking. With reference to Algorithm 2 below, the current detection $d \in D_n$, is projected backwards based on the user's walking speed, $i \times w \times period_{detection}$, yielding $d_{est}$.

---

Algorithm 2: Motion Filter

Input: detection distance of the n-th detection: $D_n$,
     previous δ destections $D_{n-1}, \ldots, D_{n-\delta}$, depth: δ, walking speed: w
Output: results passing motion filter: $D_{succ}$
1:  $D_{succ} \leftarrow \phi$
2:  for $d \in D_n$ do
3:   $r \leftarrow 0$
4:   for i from 1 to δ do
5:    $d_{est} \leftarrow d + i \times m \times period_{detection}$
6:    for $d_{history} \in D_{n-i}$ do
7:     if $|d_{est} - d_{history}| < win_{error}$ then
8:      $r \leftarrow r + 1/\delta$
9:   if $r > r_{succ}$ then
10:    $D_{succ} \leftarrow D \cup d$
11: return $D_{succ}$

---

This is compared with the previously detected position of the object, $d_{history}$, and the probability of the presence of an object increases if the history matches the projection, i.e., $[d_{est}-d_{history}]<wind_{error}$. Yielding a probability, r, higher than a given ratio, $r_{succ}$, is said to pass the motion filter and is identified as a positive detection. With this additional filtering, reflections caused by objects without any matching relative speed, such as floor or side walls, can be filtered out as shown in FIG. 5A. In this figure, detections passing a motion filter (marked as solid circles) represent only the signals from target obstacles (i.e., the wall users walking towards) while the detections caused by humans body, floor, and multi-path reflections inside the wall are excluded. A similar effect can also be found in FIG. 5C, where most signals from side walls are also filtered out. However, the noisy detections in a cluttered environment cannot be completely eliminated by the motion filter 33. As shown in the same figure, more than 10 false detections caused by side objects pass our motion filter since those objects are too close to each other, resulting in a significant number of false positives which might annoy users. In the example embodiment, these false positives are reduced/removed by using the visual detector 34 to ensure the detected object being in front of the user.

To overcome the inherent limitation of acoustic detection, an additional sensing layer can be added, for example using the phone's rear facing camera. This removes false positives created by the acoustic detection and adds information about the direction of the object. In the BumpAlert application, it is assumed that users will hold their phones in a typical position, and the rear facing camera's line of sight will be clear to capture objects in front of the user. It is envisioned that the BumpAlert application can send the user texts or vibrations so as to keep their phones' tilt in its operational range.

There are two main challenges to detect objects present in the rear camera view. The first is to determine the presence of objects and the second is to determine the distance between the user and the objects due to the lack of depth perception in images taken by only a single camera. Bump-Alert does not use any a priori information about the shape and color of the objects. Having no prior knowledge of obstacles makes the BumpAlert application more general, enabling detection of any type of dangerous objects and preventing collision with them.

Detecting general objects without any a priori knowledge is difficult. However, the main goal of the BumpAlert application is not to identify every object in the scene but to know if there is any object in front of the user. Specifically, BumpAlert adopts the back projection technique to identify the objects that are different from the ground/floor. The basic idea is to use the texture of the ground surface the user is walking on and compare it with the rest of the image, looking for textural similarities and dissimilarities. More specifically, back-projection is a method to detect if part of an image matches a predefined color model. The color model is a histogram of color (usually in HSV space defined by Hue and Saturation). For each pixel p(x,y) in image, back-projection project its color back into the histogram of the predefined color model and check what is the output value for this color in the histogram. Higher the output value implies higher correlation between the pixel p(x,y) and the predefined color model. In this application, the color model is the HSV histogram of ground area, thus, object with texture different from ground area can be identified by back-projection algorithm.

Referring to FIG. 6A-6D, a 10×10 blurring filter is first used to reduce the noise from the image, and the image is then transformed into the HSV space. A back projection algorithm is then applied to determine which parts of the image are not related to the ground/floor texture. The last step is to apply an erosion filter to remove any residual errors from the back projection algorithm. After completing these steps, blobs with areas larger than a predefined threshold are identified as obstacles and the point that is closest to the bottom of the image is returned as the closest obstacle. Further details regarding the back projection technique may be found in an article by A. Derhgawen and D. Chose entitled "Vision based obstacle detection using 3d hsv histograms" In Proceedings of IEEE INDICON '11 which is incorporated in its entirety by reference. Other techniques for identifying objects from image data also fall within the broader aspects of this disclosure.

Figure 7:
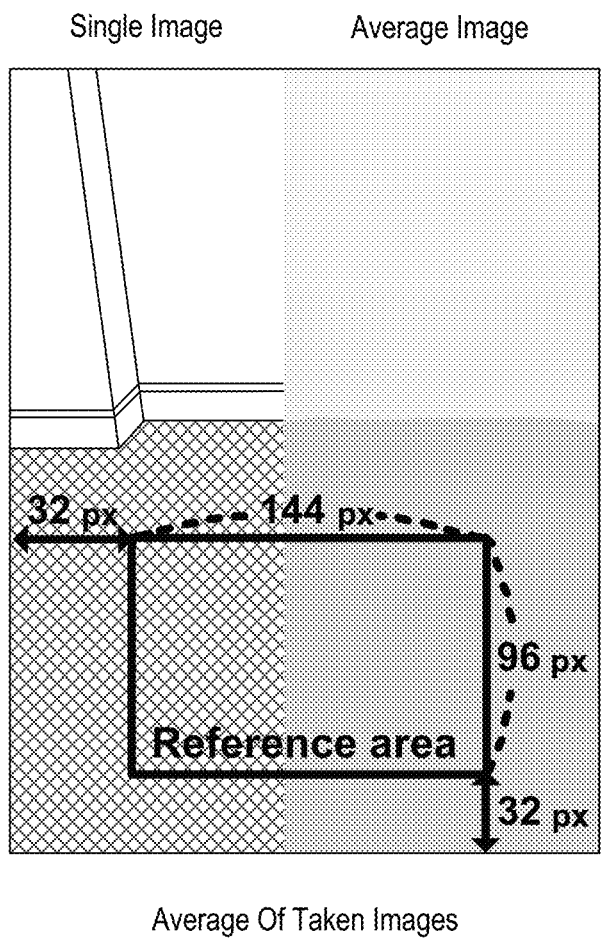
FIG. 7 is a diagram depicting location of the average area captured by a camera in a mobile phone.

Astute readers might observe that the key assumption in the back projection is the knowledge of ground/floor texture. In case an object is erroneously included in the region identified as a reference of ground/floor, the object won't be visible to the visual detector 34 because the back projection classifies the object as a part of ground/floor. Identifying the area in arbitrary images consisting of ground/floor is difficult, but it does not cause a problem for the BumpAlert application. Images are only taken when users are walking and using their phones in an assumed position. Under this assumption, the application can ensure that a specific area in the image can represent the information of the ground/floor with a high probability. In order to determine this area, an experiment was conducted with ten participants. They were requested to take pictures while using their phones at a comfortable position 2 m away from a door. The average image of all the pictures taken is shown in FIG. 7, where the reference area 71 indicates area consisting of the information of ground/floor. The size of the area chosen is 96 pixels×144 pixels located 32 pixels above the bottom of a 240×320 image. The area is chosen above the bottom of the image since it is possible to include the user's feet into the bottom area of images. It is understood that the size and location of the reference area may vary within the scope of this disclosure.

After the closest point of objects in the image is identified, a pixel difference from the detection point to the bottom of the image is defined as p, and the pixel-to-real-world distance transform is computed as:

$$d = \text{pixel\_to\_distance}(p, h_p, t_p), \quad (1)$$

where d is the real-world distance between the detected object and the user, and $h_p$ and $t_p$ represent the height and the tilt of the user's phone with respect to the ground. More specifically, camera projection is a method to rebuild the camera position/orientation from the image taken, which is further used in this project to estimate the distance from camera to user. After obtaining the pixel coordinates $(p_x, p_y)$ of the obstacle from the visual detector 34, the distance of the obstacle can be determined from the projection geometry.

Figure 8A:
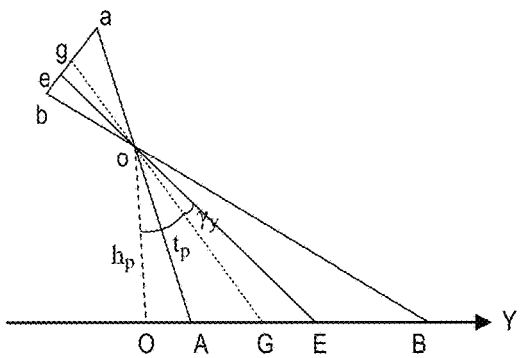
FIGS. 8A and 8B are diagrams illustrating the camera projection model along the y-axis and x-axis, respectively.

Considering t as the phone's tilt versus the vertical plane, 2α as the camera's vertical aperture, $h_p$ is the height of the camera, and $\gamma_y$ is the vertical angle between the obstacle and the optical axis. The projection on the y-axis can be built as shown in FIG. 8A. The angle $\gamma_y$ is calculated by:

$$\gamma_y = \tan^{-1}\left(\frac{p_y \cdot 2\tan(\alpha)}{H}\right). \quad (1)$$

The vertical distance $d_y = \tan(t_p + \gamma_y) h_p$, where $p_y$ is the vertical pixel offset of the detected object and H the height of image.

| Sym | Description |
| --- | --- |
| W/H | width/height of image |
| $p_x/p_y$ | horizontal/vertical pixel offset of detected objects |
| $h_p$ | height of phone above ground |
| $t_p$ | tilt of phone versus vertical plane |
| α | half of vertical aperture |
| β | half of horizontal aperture |
| $\gamma_x$ | horizontal projection angle between object and optic axis |
| $\gamma_y$ | vertical projection angle between object and optic axis |

Figure 8B:
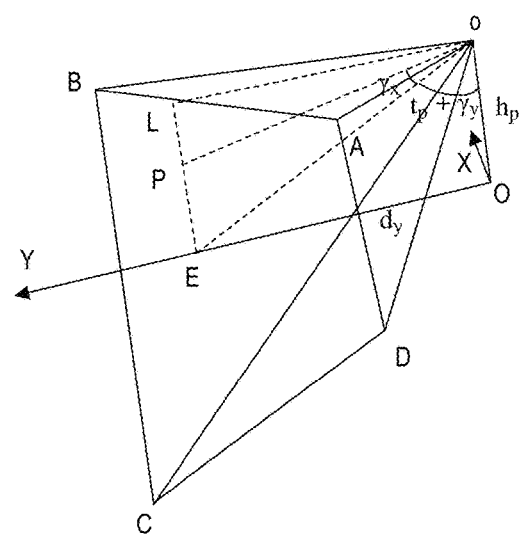

To calculate the horizontal distance $d_x$, first obtain the horizontal angle $\gamma_x$ between the obstacle and the image center f as shown in FIG. 8B. From the geometry projection on the x-axis, the angle $\gamma_x$ can be calculated as $$\gamma_x = \tan^{-1}\left(\frac{p_x \cdot 2\tan(\beta)}{W}\right),$$

where 2β is the horizontal perspective aperture, and $p_x$ is the horizontal pixel offset of the detected object and W is the image's width. The distance along the x-axis is determined by:

$$d_x = \frac{d_y \cdot \tan(\gamma_x)}{\sin(t_p + \gamma_y)}. \quad (2)$$

Finally, the distance in the real world is obtained as $$d = \sqrt{d_x^2 + d_y^2} \quad (3)$$

A detailed derivation of this transform based on the camera projection model is found in an article by J. Fernandes and J. Neves entitled "Angle invariance for distance measurements using a single camera" In Industrial Electronics, 2006 IEEE International Symposium, vol. 1 (2006) and incorporated herein in its entirety by reference.

This computation is possible only if the height and tilt of the phone are known. As these two metrics are not fixed when people are walking, an online method is needed to estimate them. The phone's tilt can be directly acquired from the accelerometer as $t_p = \cos^{-1}(acc_z/acc_{mag})$, where $acc_z$ is the acceleration orthogonal to the surface of the phone and the $acc_{mag}$ is the magnitude of overall acceleration caused either by the user's motion and the earth gravity.

In contrast to the tilt being able to be estimated directly by the accelerometers, the phone's height is unknown when the user is walking. BumpAlert application utilizes the results of the acoustic detector 32 to estimate the phone's height. For example, height estimation can be achieved by estimating the distance between phone and ground. As shown in FIG. 5A, this information can be clearly identified as the vertical circles that are 1.8 m away from ground. In the example embodiment, the distance of object detected is monitored over time and used as an estimation of camera/phone height as shown in FIG. 8C.

Figure 8C:
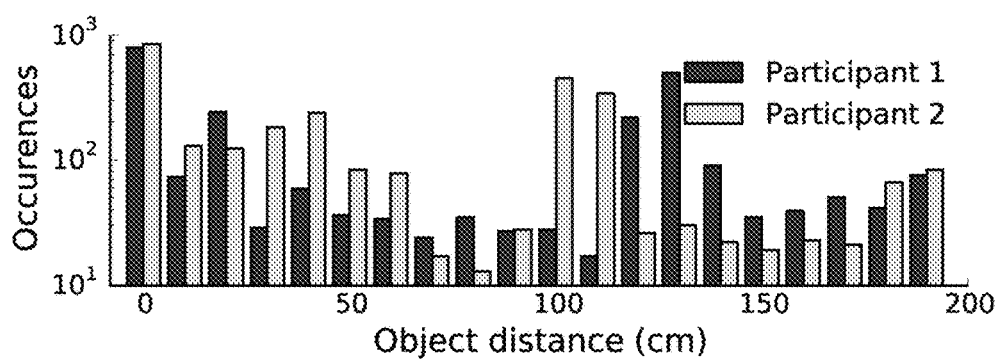
FIG. 8C is a graph depicting height estimations by the acoustic detector.

FIG. 8C plots a histogram of objects detected by the acoustic detector 32 with different estimated distances. This data was collected for two participants of different heights. The maximum peak at distance 0 is the receipt of the transmitted signal. Detections within [10, 60] cm are reflections from the human body. There are also relatively fewer detections in the region [70, 180] cm. The main reason for this phenomenon is that people need a space in front to move forward, resulting in a low probability that there is an object in this range while people are walking. Thus, the highest peaks within this range are actually the reflections off from the floor. As shown in the figure, this is approximately 120 to 140 cm for participant 1 and ranges from 100 to 120 cm for participant 2. By tracking the distance in this range, the phone's height can be estimated with an error of less than 20 cm. This is a novel design since existing image-based detections simply assume the height of a camera is known. This parameter might be easy to get in certain scenarios, such as installing the camera at a fixed location inside a car, but not in this application where the height of a phone varies with users depending on their height and angle at which the phone is held.

Even though visual detection is sufficient to determine both the direction and distance of objects in front of the users, it is not desirable to constantly use the rear camera for the following reasons: computational cost of image processing is much higher than acoustic detection, thus consuming more power; distance measured is less accurate due to the changing tilt and height estimation; back projection may be inaccurate for complex floor patterns; and falsely identifying pattern transitions on the ground/floor as obstacles.

From experiments, the false positives in visual detection are caused mainly by the following three factors. First, shadows cast on the ground will cause the color of the ground/floor to be different from its surroundings, hence flagging as a different texture area. Second, overhanging obstacles causes the estimated distance to be farther away than the actual position because their bodies are not fully connected to the floor. Third, changing patterns of the ground/floor also causes false detections and is mistaken as an obstacle as it is different from the identified ground/floor texture. A representative error pattern of visual detection can also be found as the purple crosses shown in FIGS. 5A-5C. For example, there is a burst of false positives between 3 and 5 seconds in FIG. 5B, even though there were no objects ahead. The detection is also less accurate than the acoustic detector. As shown in FIG. 5A, the estimation errors of the visual detectors between 5 and 8 seconds are about 10-100 cm while the acoustic detector has errors less than 15 cm. These challenges can be met by combining the acoustic and visual detectors as described below.

As mentioned earlier, the tilt of a phone's camera is directly related to its accelerometer. Similarly, the acoustic detector 32 needs feedback from the phone's sensors that provide information about the user's walking speed to improve the detection accuracy. Using the accelerometer readings, the steps that a person takes can be detected as there exists a period with high acceleration and a period with low acceleration. Each peak-to-peak cycle indicates if a step has been taken and the walking speed can be estimated as the product of step frequency and average step size. In the BumpAlert application, the step size can be either entered by users or set to the default average step size. This coarse estimation of walking speed is adopted in various applications, such as dead-reckoning systems. The acceleration can also allow the system to determine if the user is walking or stationary when its variance exceeds a predefined threshold.

Figure 9:
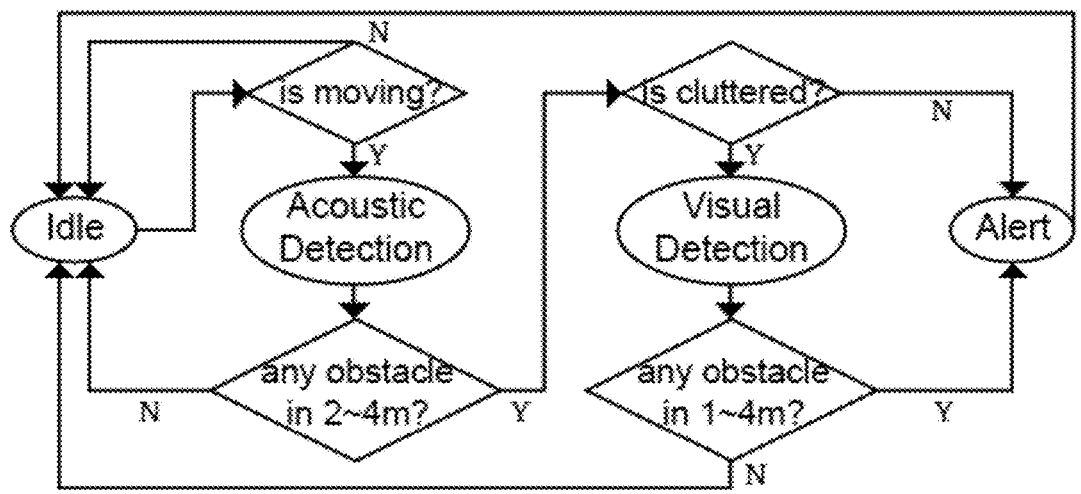
FIG. 9 is a flowchart illustrating an example fusion algorithm employed by the motion filter.

FIG. 9 depicts an example fusion detection algorithm implemented by the BumpAlert application. First, the detection algorithm need not be run when the user is stationary. From the input from the accelerometer, the motion estimator makes a determination whether the phone is moving. The acoustic detector and the motion filter are operational only when the user is deemed to be moving (e.g., speed>zero); otherwise, these functions are disabled to conserve power.

Once triggered, proximate objects are detected by the acoustic detector. If any obstacle is discovered by the acoustic detector and this detection is not convincing enough, the visual detector can triggered to double-check the detection result. The acoustic detector is good at detecting the objects around the user within a certain range but is less effective in dealing with side objects (e.g., in cluttered environments). In contrast, the visual detector is free from the side object problem since it focuses on a reference area in front of the user.

To identify cluttered environments, the motion filter estimates the number of stationary objects (i.e., having relative speed of zero). This aspect of the motion filter is the clutter filter and it can filter out those objects that do not have any relative speed to the user. After applying the clutter filter, few objects are not filtered out in an outdoor environment; whereas, many objects may be present in an aisle environment. Thus, the aisle environment can be identified as cluttered since the number of objects passing the filter exceeds a predefined threshold. Reuse of the motion filter is also a novel aspect in BumpAlert to identify a cluttered environment, thus providing a hint to the fusion algorithm for triggering the visual detector.

In the fusion algorithm, different detectors complement each other in different situations. In a cluttered aisle, side walls will be falsely classified by the acoustic detector as obstacles, but are filtered out by the visual detector since such side objects are not captured by the rear camera. On the other hand, crossing from a cement floor to a grassy area is falsely classified as obstacles by the visual detector but is filtered out by the acoustic detector because no reflections are received from the grassy area. By integrating these detectors, BumpAlert can therefore discover dangerous objects with high accuracy and low false positive rate.

In the example embodiment, the BumpAlert application was implemented as an Android application on the Galaxy S4. As BumpAlert relies only on the phone's built-in sensors, it can be ported to different platforms, such as iOS and Windows. For BumpAlert to be computationally efficient, the signal processing, such as bandpass and matched filters, are implemented in C and interfaced through the Java Native Interface (JNI), which yielded shorter execution times. The control logics shown in FIG. 9 are implemented in Java due to its low computation requirement. As a result, each iteration of the acoustic/visual detector can be completed within 25/80 ms while its period is set to 100 ms.

One implementation issue faced was that Media Player classes are controlled by a state machine, so a processing called "prepare" needs to be invoked before playing the audio files. This causes a random delay in starting to play the next clip. The problem can be mitigated by double-buffering, where multiple player classes are created and prepared in advance, waiting for the invocation of a play command. However, even with double-buffering, the non-real-time nature of Android incurs a delay of 200-600 ms between the invocations of the play function and the actual sound being played. This phenomenon also occurs in the Audio Record class, limiting the rate of the acoustic detector to 1 Hz. This problem is circumvented by playing a large audio file composed of multiple copies of sound signals. The file used is a 10-minute WAV file in which a 40-sample known signal is played every 100 ms. At the end of the file, another player class has been prepared to continue playing the required sound. With this method, there is no limit on the trigger rate of the acoustic detector.

The maximum rate to trigger acoustic/visual detectors was chosen to be 10 Hz and the sensing range to be 2-4 m in order to balance between detection accuracy and processing cost. The average human walking speed is about 1.5 m/s and the reaction time to an auditory alert is about 150 ms. This reaction time is similar to using a vibration alert. Thus, a sensing period of 100 ms with a distance range of 2-4 m is sufficient to alert the user, and the choice of these parameters works well.

To run BumpAlert with other applications simultaneously, it was implemented as a system service. However, in the latest version of the Android API, the camera is not allowed to be used in a background service due to privacy issues. Likewise, in BumpAlert, images are not saved but only processed for object detection.

A series of experiments were conducted to assess the performance of BumpAlert in real-world settings. Since the goal of these experiments is to capture and evaluate the performance of BumpAlert, we manually selected objects of different sizes and asked participants to walk toward those objects multiple times under different representative scenarios. The benefit of this setting is to collect ground truth and quantize the detection of BumpAlert accurately. This information is important to infer the performance of BumpAlert in the real world but difficult to obtain if participants are allowed to walk toward random obstacles in a single long route. Moreover, as shown in the experiments, the performance of BumpAlert depends on the objects and scenarios, so the objects seen in a long route create a significant bias in the final result. For example, a path consisting of 10 walls and 5 dustbins can get a better result than the one of 5 walls and 10 dustbins because wall is an easy target to detect. To avoid this bias, we chose to provide the accuracy of BumpAlert against each object in different scenarios rather than the aggregated accuracy in a single long route. The usability of BumpAlert is evaluated further below via a user's study that collects feedbacks from 21 participants who used BumpAlert for 15 min.

In each experiment, 7 participants are instructed to walk towards various objects, such as walls and signboards in both indoor and outdoor environments. Each of these experiments is repeated 10 times to average the errors due to the space limitation. The three test environments used are an open outdoor area, a building lobby, and a (5 m-wide) cluttered aisle. Each participant repeats each experiment 10 times and the 10 Hz raw data of both acoustic and visual detectors are logged to evaluate the detection rate of individual experiment offline by the same detection program. This is to allow for comparison of each individual component based on the same data set, which consists of more than 12 km walking traces. We conducted experiments in the presence of environmental noises, such as students' chatting, but found those noises didn't affect BumpAlert's performance much since the frequencies of most noises associated with human activities are below 11 kHz and BumpAlert adjusts its detection based on the noise level. The only problem found is participant 7's outdoor trace collected on a very windy day (more than 24 mph). In this case, the signal received at the phone's microphone was saturated by the wind sound alone.

TABLE 1

|  | Wall | | | Signboard | | | Bin | | | Box | | |
|---|---|---|---|---|---|---|---|---|---|---|---|---|
|  | TP (%) | FP (%) | Delay (ms) | TP (%) | FP (%) | Delay (ms) | TP (%) | FP (%) | Delay (ms) | TP (%) | FP (%) | Delay (ms) |
| Outdoor (Acoustic) | 100.0 | 0.6 | 320 | 98.3 | 5.6 | 516 | 96.7 | 2.8 | 567 | 91.7 | 3.5 | 470 |
| Outdoor (Visual) | 63.3 | 9.8 | 247 | 85.0 | 27.6 | 265 | 85.0 | 13.9 | 251 | 75.0 | 19.9 | 485 |
| Outdoor (Fusion) | 100.0 | 0.5 | 433 | 98.3 | 2.2 | 610 | 95.0 | 1.7 | 572 | 90.0 | 1.8 | 508 |
| Lobby (Acoustic) | 98.3 | 1.3 | 108 | 93.3 | 1.2 | 318 | 96.7 | 0.6 | 278 | 93.3 | 1.3 | 321 |
| Lobby (Visual) | 78.3 | 11.9 | 297 | 61.7 | 4.5 | 323 | 86.7 | 12.7 | 496 | 71.7 | 7.5 | 711 |
| Lobby (Fusion) | 98.3 | 1.3 | 111 | 93.3 | 1.0 | 367 | 96.7 | 0.6 | 290 | 93.3 | 1.3 | 325 |
| Aisle (Acoustic) | 100.0 | 32.1 | 105 | 100.0 | 28.2 | 193 | 100.0 | 29.1 | 203 | 98.3 | 28.0 | 245 |
| Aisle (Visual) | 98.3 | 28.4 | 45 | 100.0 | 27.5 | 598 | 100.0 | 22.2 | 417 | 100.0 | 26.8 | 465 |
| Aisle (Fusion) | 91.7 | 9.8 | 330 | 100.0 | 6.0 | 547 | 95.0 | 6.1 | 447 | 91.7 | 6.3 | 566 | differences in each user's walking pattern and path. The participants are instructed to press a specified button when they walk through a marker placed on the ground. This serves two purposes. First, it simulates the users being pre-occupied with a task that they would have to accomplish by looking at, or typing on their phones. Second, the ground truth can be collected as the markers are placed at 1 m interval. In this evaluation, a positive detection is defined as the obstacle detected within a range of 2-4 m. Any alert when the user is 2-4 m away from the target object is classified as a successful alert and the ratio of these alerts is called the true positive (TP) rate. On the other hand, any alert occurring when the user is actually 4 m or farther away from the target object is classified as a false alert, and the corresponding rate is calculated as the false positive (FP) rate. The average delay is defined as the time from a participant walking through the 4 m marker to the time an alert is triggered.

In this experiment, a set of four objects are used as obstacles in three different environments. They are wall, signboard, dustbin and cardboard box, which are ordered by their relative size. These objects are selected to represent different types of objects in the real world. The difficulty of detection is due mainly to the size of objects. For example, similar results are obtained for the detection of a glass door and a wall. Moreover, since these objects can easily be found/moved in both indoor and outdoor environments, the performance degradation caused by different environments can be accurately measured in this setting. Other objects, such as pillars and cars, are also tested and shown to have similar characteristics but those results are omitted due to space limitation.

From the results in Table 1, one can see that the acoustic detector outperforms the visual detector in TP rate because the sensing range and sensitivity of the former is longer and better than the latter. The overall TP rate of acoustic detection is higher than 95% which is sufficient to identify most dangerous objects. The average delay in all cases is shorter than 650 ms for both visual and acoustic detections. This low delay of BumpAlert provides the users walking at 1.5 m/s with more than 2 s to react and avoid the obstacles, which is much longer than the human's reaction time.

The aisle scenario shows a high FP rate for the acoustic detection due to its cluttered environment. In contrast, the visual detection is not affected by this scenario due to the directional nature of image taken by the phone's rear camera. Therefore, the average FP rate of visual detection in this scenario is even lower than the FP rate of acoustic detection. This complementary nature of acoustic and visual detectors is exploited by using a fusion algorithm to ensure a high TP rate in outdoor environments while significantly reducing the FP rate in indoor environments as shown in Table 1. The fusion algorithm also lowers the FP rate in outdoor environments which are due mainly to a strong wind blowing into the phone's microphones. Actually, many false detections in the 5 m-wide aisle are not wrong since there exist objects, e.g., the water fountain on the side and the emergency sign at the ceiling, which is in front of users within 2^m. If the detection range is shrunk to 1-2 m, the FP rate of acoustic detector is reduced from 28% to 5% and it is reduced further to 2% when a combination of acoustic and visual detection is applied. Note that there is a trade-off between false detection and detection range. One possible resolution is to alarm users when they are located in a cluttered environment where the detection range of BumpAlert is shrunk, and hence they need to pay closer attention to their walking.

Figure 11:
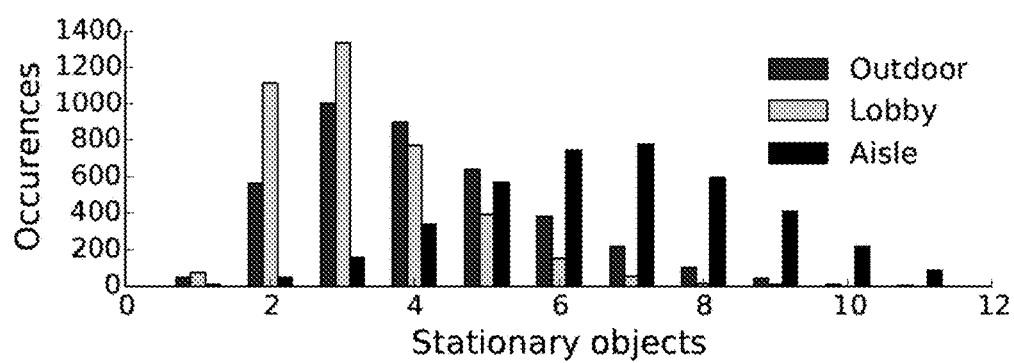
FIG. 11 is a graph depicting stationary objects passing the clutter filter.
Figure 10B:
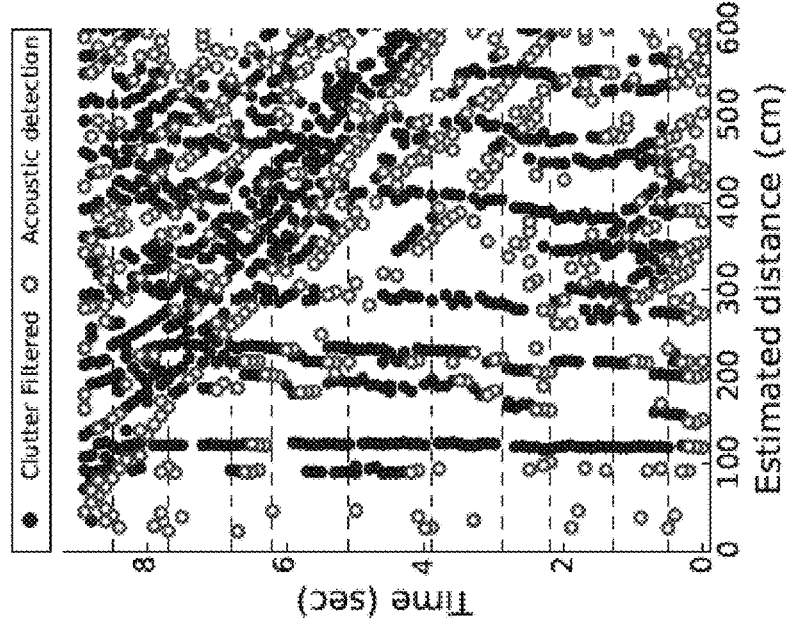
FIGS. 10A and 10B are graphs depicting objects identified by a clutter filter in an outdoor environment and in an indoor aisle, respectively.
Figure 10A:
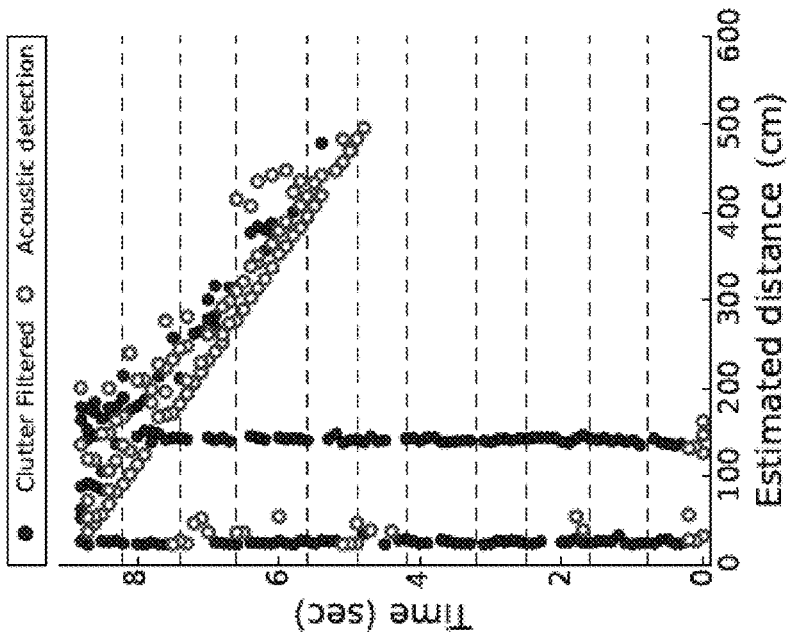

As introduced earlier, the key component of the fusion algorithm to work properly is its ability to estimate the number of stationary objects through the clutter filter. In real-world experiments, the threshold of stationary objects to classify environments as cluttered is set as 5 (i.e., turning off the visual detection when there are <5 stationary objects). The distribution of stationary objects in different scenarios is plotted in FIG. 11. The experimental results also validate the effectiveness of the clutter filter in enabling the visual detector under a proper condition.

Of all the objects considered, the wall is found the easiest to detect due to its large size, and the box is the hardest in terms of TP ratio and delay. Moreover, the TP rate of signboard detected by the visual detector is lower than that of other objects, which is due to the signboard overhanging above the floor as shown in FIG. 7(b). Although the visual detection for the signboard is above 80% in outdoor and aisle environments, their high TP rates are also accompanied by a high FP rate. This implies that the detector was guessing most of the time, leading to the high TP and FP rates and not a true representation of accurately detecting the object.

TABLE 2

| id | acousticTP | acousticFP | visualTP | visualFP | $\bar{h}_p$ (m) | $\bar{t}_p$ (°) |
|----|------------|------------|----------|----------|-----------------|------------------|
| p1 | 97.5  | 5.4 | 97.5  | 36.4 | 1.3 | 52 |
| p2 | 100.0 | 1.8 | 100.0 | 11.1 | 1.1 | 54 |
| p3 | 95.0  | 2.5 | 87.5  | 21.3 | 1.3 | 53 |
| p4 | 100.0 | 3.2 | 90.0  | 17.6 | 1.1 | 39 |
| p5 | 90.0  | 0.2 | 12.5  | 2.7  | 1.0 | 31 |
| p6 | 100.0 | 1.7 | 100.0 | 32.2 | 1.2 | 65 |
| p7 | 100.0 | 2.6 | 100.0 | 17.6 | 1.2 | 56 |

To study the effects of different participants with different phone-holding positions and walking patterns, the above results are separated based on individual participants. The phone tilts/heights and the corresponding detection results are summarized in Table 2. According to the experiments, the tilt of phones, $t_p$, varies from 31° to 65° among different participants; so does the phone height hp vary from 1 to 1.3 m. These parameters for the same user did not vary much over time.

An interesting finding in acoustic detection is that both TP and FP rates are slightly different among participants. Several tests with different holding positions are repeated and found that the variation is affected by the way the phone is held and the AGC of the phones' microphones. For example, when the speakers are being blocked by fingers, the received signal strength is low due to the obstruction. On the other hand, if the phone is held tightly, the magnitude of the received signal sent directly from the phone is increased. This signal may sometimes be large enough to saturate the range of the microphones, so the signal magnitude from reflections is lowered due to the lower gain adapted by AGC. However, with the adaptive threshold mechanism as described earlier, BumpAlert can accurately estimate the noise level and detect reflections effectively.

The extreme low visual detection ratio of participant p5 was caused by his way of holding the phone, 30° with respect to the horizontal plane. The detection results collected from participant p5 show that only those images close to (within 1 m of) the obstacles can yield a sufficient area for detection because of the low tilt of the phone, implying that visual detection is not applicable to certain postures of holding a phone. Two additional participants who hold their phones with the posture similar to participant p5 were recruited to repeat the above experiments. The results indicate that the visual detector is unable to operate with tilt lower than 30° for identifying 2 m-away objects. However, the high probability of successful visual detection by the other users also implies that visual detection works with a broad range of tilts from 40° to 65°. One potential way to address this issue is to warn the users, when they enable BumpAlert but hold their phones with the tilt less than 40°. According to the users study, most users feel comfortable with this operating range of BumpAlert.

A final experiment is to evaluate BumpAlert for its real-time performance and resource consumption. Under its four different configurations, BumpAlert was run for an extended period of time in typical environments. The CPU usage of BumpAlert is logged via the top command at an interval of 10 seconds. A 1-hour trace is averaged to obtain CPU usage as well as power consumption. Four different scenarios are tested: idle (with backlight on), acoustic detection only, visual detection only, and trace. The idle case is used as a baseline which mainly represents the power consumed by the backlight. In the case of acoustic or visual detection only, each algorithm is run independently at 10 Hz with backlight on. The trace characterizes the real-world behavior of participant 1 when he is walking between his home and work. The result of participant 1 was displayed because his travel time on foot is longer than other participants. The round-trip trace is plotted for better visualization over time.

Figure 12:
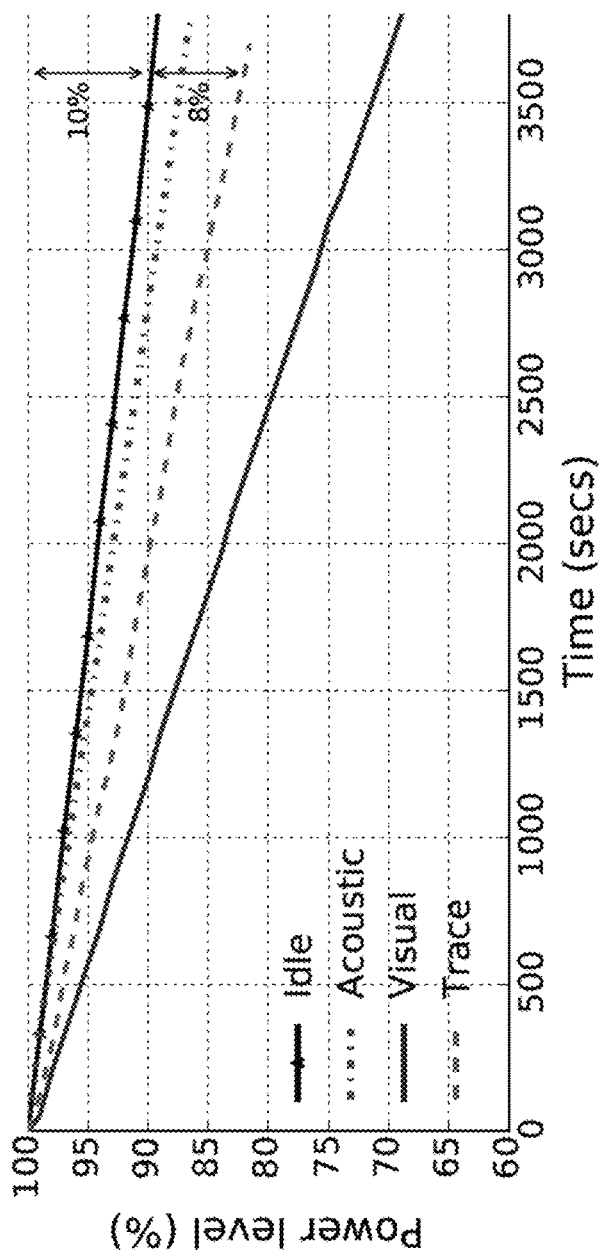
FIG. 12 is a graph depicting energy consumption of a mobile phone implementing the BumpAlert application.

The CPU usages when the app is Idle, in Acoustic only, and Visual only are 3.082%, 8.917% and 17.795%, respectively. One can see that the CPU usage of Visual detector is approximately twice the value of Acoustic detector. As the high CPU usage, the power consumption of the visual detector is also observed to be much higher than the acoustic detector's as shown in FIG. 12. The visual detector consumes more power not only because the computation is more complex but also due to the higher power consumption of keeping the camera. In the actual usage as the trace of participant 1, power consumption is only 8% per hour. The actual CPU usage and power consumption depend on the walking route and the decision to trigger algorithms.

Figure 13A:
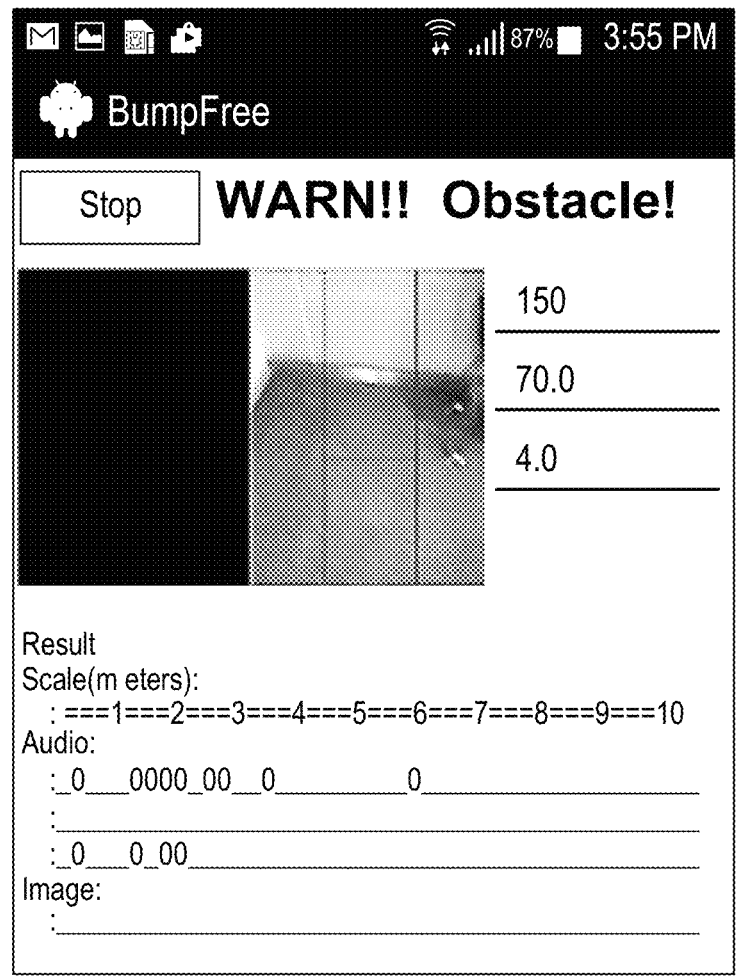
FIGS. 13A and 13B depict example user interfaces from the BumpAlert application.

21 passers-by (10 females and 11 males) were randomly selected on campus without prior knowledge of BumpAlert to evaluate its usefulness and practicality. The users were asked to try out BumpAlert for 15 minutes and fill out a survey form. Users tried a demo version of BumpAlert as shown in FIG. 13A at locations shown in FIG. 13C. The results are summarized in Table 3.

TABLE 3

| Questions | Disagree | No option | Agree |
|-----------|----------|-----------|-------|
| I can play my phone around 40° (at walking for detecting obstacles) | 10 | 0 | 90 |
| I can play my phone around 50° | 10 | 18 | 72 |
| I can play my phone around 60° | 80 | 5 | 15 |
| Detection accuracy is helpful | 14 | 14 | 72 |
| Detection range is acceptable | 28 | 0 | 72 |
| False alarm is bothering | 39 | 32 | 29 |

The first section of the survey attempts to analyze the prevalence of distracted walking. The result indicates that 81% of the participants use their phones while walking and 43% of them had run into obstacles due to distracted walking. Even though a half of the participants did not bump into any obstacle before, 76% of them were afraid of running into obstacles when they use their phones while walking. The percentage of people colliding with obstacles increases to 86% if their friends who had bumped into objects are included.

Figure 13B:
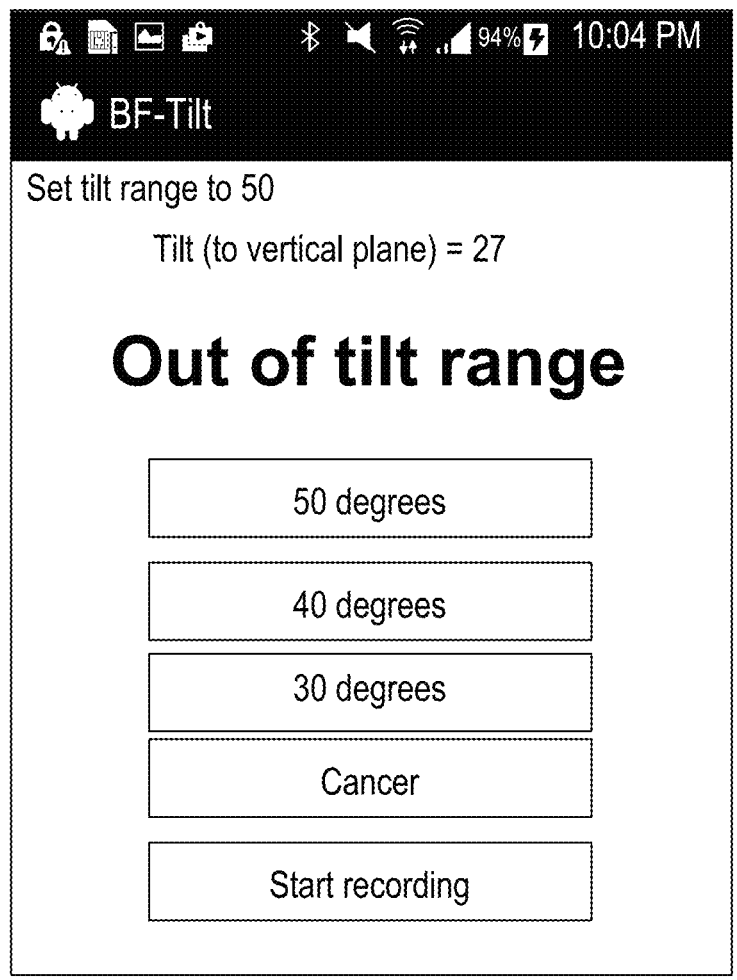

The second section of the survey attempts to know the tilt when the users hold their phones and check if people are willing to hold phones in a specific tilt range for the benefit of obstacle detection and warning. A separate Android survey app shown in FIG. 13B was used to record and inform the participants of the tilt in holding their phones. They were first asked to walk with BumpAlert enabled to record tilts when they hold their phones in the most comfortable position. Then, we selected several different angles that allow the survey app to monitor the tilt of phones and provide a feedback (via vibration and a red text) when the user doesn't hold the phone in the selected angle within a ±10° range.

The phone tilt has been studied extensively by continuously recording the tilt via published Android widgets. However, the users' state (e.g., walking or sitting) when the tilt is recorded was not reported there. In this users study which records the phone tilt when users are walking, most participants hold their phones at approximately 35° relative to the ground. This result matches the average phone tilt when Google Maps is run. This tilt distribution is not optimal for BumpAlert. However, after having experience in holding phones with different angles and being told about our purpose, 90% of participants were willing to hold their phones between 40° and 50°, which is proven good for BumpAlert. Thus, it is reasonable to provide similar feedback when BumpAlert is enabled but the tilt of phones is not in the operation range.

Figure 13C:
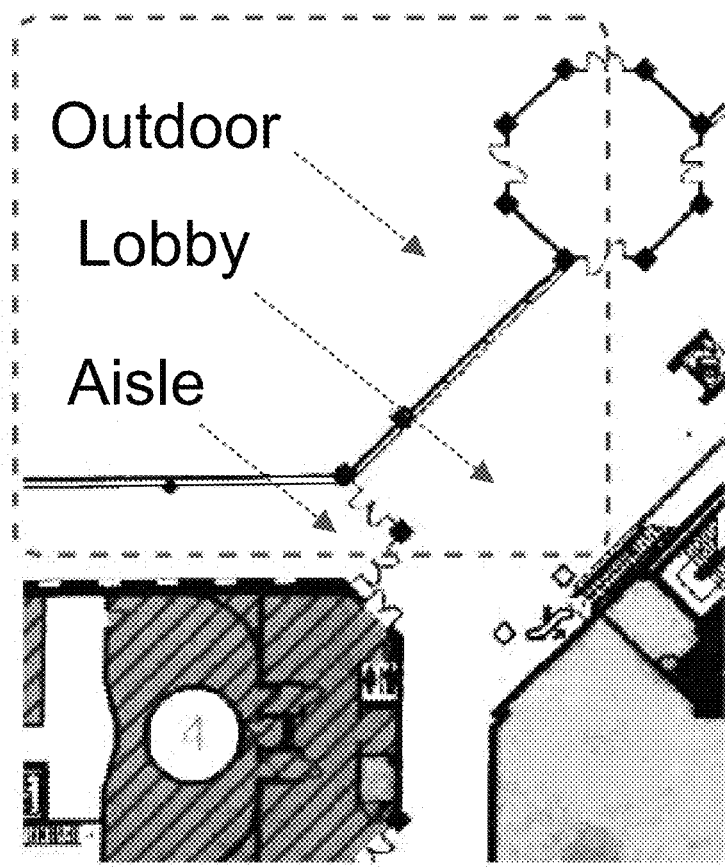
FIG. 13C is a diagram depicting a test location for the BumpAlert application.

The third section of the survey asks participants to evaluate the usefulness of BumpAlert after a 15 min trial in three scenarios as shown in FIG. 13C. The three criteria we used are the detection accuracy, detection range and false-alarm rate. About 72% of the participants agree that the detection accuracy and range are adequate, allowing them enough time to react to imminent obstacles. Some participants have commented that they would be able to avoid obstacles at even a shorter distance, such as 1.5-3 m. This feedback was useful for BumpAlert to reduce the false positive ratio. 29% of the participants did not want to have any false alarm. We found some of participants react even to the correct detection of a wall 4 m away as a false alarm. Based on the performance of BumpAlert we were able to satisfy most participants with low false positive rate and good detection ratio.

The last section of the survey addresses the issue of power consumption. Only 14% of the participants want the power consumption to be below 4% per hour. The power consumption of BumpAlert varies from user to user, depending on the users' activities. In an initial experiment, power consumption is approximately 8% per hour, which meets the criteria of 86% of people who are willing to use the application.

The techniques described herein may be implemented by one or more computer programs executed by one or more processors residing in a mobile device. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality. It is understood that grouping of operations within in a given module is not limiting and operations may be shared amongst multiple modules or combined into a single module.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented system for identifying obstacles in path of a pedestrian using a handheld computing device, comprising:
    a motion estimator configured to receive an input from an accelerometer residing in the handheld computing device and operates to determine speed at which the handheld computing device is moving;
    an acoustic detector interfaced with a speaker in the handheld computing device and operates to emit acoustic signals via the speaker, the acoustic detector interfaced with a microphone in the handheld computing device and, via the microphone, operates to detect the acoustic signals reflected by objects proximate to the handheld computing device and, in response to the detected acoustic signals, determines distance to a given object using timing between the emitted acoustic signals and the detected acoustic signals; and
    a motion filter interfaced with the motion estimator and the acoustic detector, the motion filter determines rate at which distance to the given object is changing from the distance measures received from the acoustic detector and, in response to a determination that the rate at which the distance to the given object changes is substantially same to the speed at which the handheld computing device is moving, identifies the given object as an obstacle in the path of the pedestrian, wherein the motion estimator, the acoustic detector and motion filter reside in the handheld computing device and are implemented by instructions executed by a processor residing in the handheld computing device.

2. The system of claim 1 wherein the motion filter estimates an expected distance to the given object using the distance to the given object, compares the expected distance for the given object to other distances determined by the acoustic detector, and increases probability that the given object is an obstacle when difference between the expected distance for the given object and at least one other distance determined by the acoustic detector is less than a threshold.

3. The system of claim 1 wherein the motion filter identifies the given object as an obstacle in response to a determination that the rate at which the distance changes is within one meter per second of the speed at which the handheld computing device is moving.

4. The system of claim 1 wherein the motion filter, in response to a determination that the rate at which the distance to the given object changes differs from the speed at which the handheld computing device is moving, ignores the given object.

5. The system of claim 1 wherein the acoustic detector and the motion filter are operational when the speed at which the pedestrian is moving is greater than zero.

6. The system of claim 1 further comprises an alert mechanism interfaced with the motion filter, where the motion filter determines a distance to the given object and the alert mechanism compares the distance to the given obstacle to a threshold and, in response to a determination that the distance to the given obstacle is less than the threshold, generates an alert for the pedestrian.

7. The system of claim 1 further comprises a visual detector configured to receive image data from a camera in the handheld computing device and determines presence of objects in the path of the pedestrian from the image data.

8. The system of claim 7 wherein the visual detector determines presence of object from the image data by determining texture of the ground being traversed by the pedestrian and distinguishing an object as being different from the determined texture of the ground using a back-projection method.

9. The system of claim 7 wherein the motion filter determines a number of objects proximate to the handheld computing device and, in response to a determination that the number of object exceeds a threshold, activates the visual detector.

10. The system of claim 7 wherein the visual detector further determines tilt of the handheld computing device with respect to the ground using the input from the accelerometer, determines height of the handheld computing device from the ground using the acoustic signals, and determines a distance to a given object from the image data based in part on the tilt of the handheld computing device and the height of the handheld computing device.

11. The system of claim 10 wherein the motion filter identifies the given object as an obstacle in response to a determination that the rate at which the distance to the given object changes is substantially same to the speed at which the handheld computing device is moving and a corresponding object occurs in the image data as determined by the visual detector.

12. A computer-implemented method for warning a pedestrian of obstacles in the path of the pedestrian carrying a handheld computing device, comprising:
    determining, by a processor residing in the computing device, speed at which the computing device is moving from input of a motion sensor residing in the computing device;
    determining, by the processor, a present distance to a given object proximate to the computing device, where the distance is computed from timing between acoustic signals emitted from a speaker of the computing device and acoustic signals detected by a microphone of the computing device;
    determining, by the processor, rate at which distance to the given object is changing;
    identifying, by the processor, the given object as an obstacle in the path of the pedestrian, the identification occurring in response to a determination that the rate at which the distance to the given object changes is substantially same to the speed at which the handheld computing device is moving; and
    generating, by the processor, an alert for the obstacle in response to a determination that the distance to the given object is less than a threshold.

13. The method of claim 12 further comprises identifying signals reflected from objects proximate to the computing device using a bandpass filter and a matched filter corresponding to acoustic signals emitted from the speaker.

14. The method of claim 12 further comprises determining distance to the given object by multiplying speed of sound by time difference between the signals reflect from the given object and corresponding acoustic signals emitted from the speaker.

15. The method of claim 12 wherein identifying the given object as an obstacle further comprises
    determining distance to objects proximate to the computing device during a window of time;

estimating an expected distance to the given object from the present distance to the given object and the speed at which the computing device is moving;

comparing the expected distance for the given object to the distances of objects proximate to the computing device in the window of time;

increasing probability that the given object is an obstacle when difference between the expected distance for the given object and at least one of the distances of objects proximate to the computing device is less than a threshold.

16. The method of claim 12 further comprises filtering the given object in response to a determination that the rate at which the distance to the given object changes differs from the speed at which the computing device is moving.

17. The method of claim 12 further comprises determining a number of objects proximate to the computing device;

comparing the number of proximate objects to a threshold; and activating a camera in the computing device in response to a determination that the number of proximate objects exceeds the threshold.

18. The method of claim 17 further comprises determining presence of objects in the path of the pedestrian from image data captured by the camera; and identifies the given object as an obstacle in response to a determination that the rate at which the distance to the given object changes is substantially same to the speed at which the handheld computing device is moving and a corresponding object occurs in the image data captured by the camera.

* * * * *